US011431167B2

(12) United States Patent
Porter et al.

(10) Patent No.: US 11,431,167 B2
(45) Date of Patent: Aug. 30, 2022

(54) UTILITY DISTRIBUTION FAULT RESTORATION SYSTEM

(71) Applicant: S&C Electric Company, Chicago, IL (US)

(72) Inventors: David Porter, East Troy, WI (US);
Michael Meisinger, Chicago, IL (US);
Martin Bishop, Oak Creek, WI (US);
Stephen Williams, Caledonia, WI (US)

(73) Assignee: S&C Electric Company, Chicago, IL (US)

( * ) Notice: Subject to any disclaimer, the term of this patent is extended or adjusted under 35 U.S.C. 154(b) by 252 days.

(21) Appl. No.: 17/017,055

(22) Filed: Sep. 10, 2020

(65) Prior Publication Data

US 2021/0091566 A1 Mar. 25, 2021

Related U.S. Application Data

(60) Provisional application No. 62/904,832, filed on Sep. 24, 2019.

(51) Int. Cl.
*H02J 3/00* (2006.01)
*H02J 3/14* (2006.01)
*H02J 3/38* (2006.01)

(52) U.S. Cl.
CPC .............. *H02J 3/001* (2020.01); *H02J 3/14* (2013.01); *H02J 3/381* (2013.01)

(58) Field of Classification Search
CPC .. H02J 3/001; H02J 3/14; H02J 3/381; H02H 3/066; H02H 7/30; H02H 3/033; Y02B 70/3225; Y04S 20/222
See application file for complete search history.

(56) References Cited

U.S. PATENT DOCUMENTS

| 4,644,438 | A | * | 2/1987 | Puccinelli | ................ | H02H 3/07 361/96 |
| 4,758,919 | A | * | 7/1988 | Stewart | ................ | H02H 3/06 361/93.6 |
| 5,097,380 | A | * | 3/1992 | Moran | ................ | H02H 3/063 361/76 |
| 6,018,449 | A | * | 1/2000 | Nelson | ................ | H02J 13/0004 361/64 |
| 6,907,321 | B2 | * | 6/2005 | Kearney | ................ | H02H 3/063 702/58 |
| 7,751,166 | B2 | * | 7/2010 | Stoupis | ................ | H02J 13/0062 361/64 |

(Continued)

*Primary Examiner* — Ramesh B Patel

(57) ABSTRACT

A power restoration system comprising a feeder, a plurality of power sources available to provide power to the feeder, a plurality of normally closed reclosing devices electrically coupled along the feeder, at least one normally open recloser electrically coupled to the feeder, and a plurality of normally closed switches electrically coupled along the feeder between each adjacent pairs of normally closed reclosing devices. Each switch is assigned a position code having a value for each of the plurality of power sources that determines when the switch will open in response to the fault current and which power source the switch is currently receiving power from, where timing control between the reclosing devices and the switches allows the switch to be selectively opened to isolate the fault within a single feeder section between each pair of adjacent switches or between each switch and a reclosing device.

20 Claims, 6 Drawing Sheets

(56) References Cited

U.S. PATENT DOCUMENTS

| | | | | |
|---|---|---|---|---|
| 8,538,708 | B2* | 9/2013 | Yadav | H02H 7/261 |
| | | | | 702/58 |
| 8,634,175 | B2* | 1/2014 | Smit | H02H 7/262 |
| | | | | 361/42 |
| 9,217,775 | B2* | 12/2015 | Mousavi | G01R 31/3274 |
| 9,557,720 | B1* | 1/2017 | Woods | G01R 19/02 |
| 9,733,659 | B2* | 8/2017 | Yang | G06F 11/1441 |
| 10,418,804 | B2* | 9/2019 | Staszesky | H02H 7/30 |
| 11,329,479 | B2* | 5/2022 | Meisinger | H02H 3/06 |
| 2008/0024142 | A1* | 1/2008 | Opfer | H01H 75/04 |
| | | | | 324/555 |
| 2008/0225452 | A1* | 9/2008 | Stoupis | H02J 13/00034 |
| | | | | 361/62 |
| 2010/0161151 | A1* | 6/2010 | Yang | H02J 3/0073 |
| | | | | 700/297 |
| 2012/0203479 | A1* | 8/2012 | Yadav | H02J 13/00034 |
| | | | | 702/58 |
| 2013/0069437 | A1* | 3/2013 | Biallas | H04L 12/413 |
| | | | | 307/80 |
| 2014/0277804 | A1* | 9/2014 | Witte | H02H 3/093 |
| | | | | 361/211 |
| 2019/0277904 | A1* | 9/2019 | Fan | G01R 31/085 |
| 2021/0091557 | A1* | 3/2021 | Meisinger | H02H 3/003 |

* cited by examiner

UTILITY DISTRIBUTION FAULT RESTORATION SYSTEM

BACKGROUND

Field

The present disclosure relates generally to a fault restoration system for restoring power in an electrical power distribution network to as many feeder segments as possible in response to a fault and, more particularly, to a fault restoration system for restoring power in an electrical power distribution network to as many feeder segments as possible in response to a fault.

Discussion of the Related Art

An electrical power distribution network, often referred to as an electrical grid, typically includes a number of power generation plants each having a number of power generators, such as gas turbines, nuclear reactors, coal-fired generators, hydro-electric dams, etc. The power plants provide power at a variety of medium voltages that are then stepped up by transformers to a high voltage AC signal to be connected to high voltage transmission lines that deliver electrical power to a number of substations typically located within a community, where the voltage is stepped down to a medium voltage for distribution. The substations provide the medium voltage power to a number of three-phase feeders including three single-phase feeder lines that carry the same current, but are 120° apart in phase. A number of three-phase and single phase lateral lines are tapped off of the feeder that provide the medium voltage to various distribution transformers, where the voltage is stepped down to a low voltage and is provided to a number of loads, such as homes, businesses, etc.

Periodically, faults occur in the distribution network as a result of various things, such as animals touching the lines, lightning strikes, tree branches falling on the lines, vehicle collisions with utility poles, etc. Faults may create a short-circuit that increases the load on the network, which may cause the current flow from the substation to significantly increase, for example, many times above the normal current, along the fault path. This amount of current causes the electrical lines to significantly heat up and possibly melt, and also could cause mechanical damage to various components in the substation and in the network.

Many times the fault will be a temporary or intermittent fault as opposed to a permanent or bolted fault, where the thing that caused the fault is removed a short time after the fault occurs, for example, a lightning strike, where the distribution network will almost immediately begin operating normally. Permanent faults need to be cleared so that electrical power can be restored to the section of the network experiencing the service outage. Temporary faults often need to be addressed to prevent the root cause of the fault from escalating into a permanent fault as well as increase the power quality and prevent wear on the equipment. This typically requires a field crew to identify the location of the fault and then make the repairs. Permanent faults can be eventually found by the field crew, however, the time it takes to find the fault can be considerable. Temporary faults are often very difficult to find, and utility companies may decide to ignore such faults until they escalate into permanent faults.

Fault interrupters, such as reclosers, are provided on utility poles and in underground circuits along a feeder and have a switch to allow or prevent power flow downstream of the recloser. These reclosers detect the current and voltage on the feeder to monitor current flow and look for problems with the network circuit, such as detecting a fault. If fault current is detected the recloser is opened in response thereto, and then after a short delay closed. If fault current flows when the recloser is closed, it is immediately opened. If the fault current is detected again or two more times during subsequent opening and closing operations, then the recloser remains open, where the time between tests may increase after each test. Reclosers are known that use pulse testing technologies to determine if the fault is still present without applying the full fault current to the network.

When a fault is detected, it is desirable that the first fault interrupter upstream from the fault be opened as soon as possible so that the fault is quickly removed from the network to prevent damage to equipment, personal injury, fires, etc., and so that the loads upstream of that fault interrupter are not disconnected from the power source and service is not interrupted to them. It is further desirable that if the first fault interrupter upstream from the fault does not open for whatever reason, then a next fault interrupter upstream from the fault is opened, and so on. In order to accomplish this, it is necessary that some type of communications or coordination protection scheme be employed in the network so that the desired fault interrupter is opened in response to the fault.

One known protection scheme for this purpose is referred to in the art as a time-current characteristic (TCC) coordination scheme. Generally, for a TCC coordination scheme each fault interrupter in a particular series of fault interrupters on a feeder line is assigned a sliding TCC value that defines how fast the fault interrupter will open in response to detecting a fault, where the TCC value is slower for lower currents and is faster for higher currents, and where the sliding value defines a TCC curve. TCC curves with sliding values are typically used in systems where protection consists of both fuses and relayed fault interrupters. In systems without fuses a definite-time TCC is more commonly used. As the fault interrupters are provided farther downstream from the source, they are given faster TCC values so that the first upstream fault interrupter from a detected fault will open before a next up stream fault interrupter from the fault, where the particular fault interrupter will stop timing to its TCC value once a downstream fault interrupter opens and the fault is removed. However, traditional TCC coordination schemes are limited in the number of fault interrupters a feeder line can have because the TCC values cannot be too close together in order for the coordination to be effective. In other words, the number of TCC curves that realistically can be provided is limited. Moreover, fault interrupters closer to the source need to operate relatively slowly.

Another known protection scheme is referred to in the art as a communication enhanced coordination (CEC) protection scheme, where all of the fault interrupters on the feeder are assigned the same initial TCC curve or definite time response. The CEC scheme includes sending messages between the fault interrupters on the feeder, where if a certain fault interrupter detects a fault it will send a message to all upstream fault interrupters identifying the fault and stating that the fault is downstream of the sending fault interrupter. When this occurs, the upstream fault interrupters will shift their TCC curves or definite time response to be longer so that they don't open at the same time as the sending fault interrupter, but will open if the sending fault interrupter doesn't open after its TCC curve or definite time response expires. Therefore, the most downstream fault interrupter that is immediately upstream of the fault will not receive a fault message from a further downstream fault interrupter because the further downstream fault interrupter does not detect a fault, and thus the fault interrupter that is immediately upstream of the fault will be the one to open first because it is operating on its initial TCC curve or definite time response. If for some reason that fault interrupter does not open, the upstream fault interrupters will then open using the fault detection message and now operating on the longer TCC curve or definite time response. These types of CEC protection schemes do not have the limitations of the traditional TCC schemes referred to above, but their speed may still be limited by the performance of the communication method.

Sections of the feeder that lose power that are downstream of a faulted feeder section, i.e., sections of the feeder between reclosers, and have no fault can have power service restored using a second source, where a normally open recloser would prevent the second source from providing power to the feeder during normal operation. If this network configuration only includes one feeder having sources at both ends, where one of the sources is isolated with a normally open switch, then it is relatively straightforward to isolate the feeder section having the fault and provide power from both sources at opposite ends of the feeder. However, if there are multiple sources and multiple interconnected feeders, switch coordination is much more complex to isolate the fault to only the feeder section that is faulted. Thus, in these network configurations some type of communications systems is generally required to pass information between devices to identify the fault location and then restore unfaulted sections. However, these types of communications systems that may employ wireless communications schemes are only as reliable as the communications scheme itself.

SUMMARY

The following discussion discloses and describes a fault restoration system for restoring power in an electrical power distribution network to as many feeder segments as possible in response to a fault, where the system does not require communications between the devices. In one non-limiting embodiment, the power restoration system includes a first feeder having a first end and a second end, a first power source available to provide power to the first feeder at its first end, and a second power source available to provide power to the first feeder at its second end. The system also includes a first normally closed reclosing device provided in the first feeder adjacent, for example, to the first power source and allowing the first power source to provide power to the first feeder during normal operation, and a first normally open reclosing device provided in the first feeder adjacent, for example, to the second power source and allowing the second power source to provide power to the first feeder during power restoration conditions. The system further includes a second feeder having a first end and a second end coupled to the first feeder, a third power source available to provide power to the second feeder at its first end, and a second normally open reclosing device provided in the second feeder adjacent, for example, to the third power source and allowing the third power source to provide power to the second feeder during power restoration conditions. The system also includes at least second and third normally closed reclosing devices provided along the first feeder between the first and second normally closed reclosing devices and allowing the first power source to provide power to the first feeder downstream of the normally closed reclosing device during normal operation, where each of the normally closed and normally open reclosing device include an interrupter and one or more current and voltage sensors for measuring current on the feeder and measuring voltage on the feeder at both sides of the reclosing device, and where each normally closed reclosing device detects fault current and opens its interrupter in response to fault current and where the normally closed reclosing devices are coordinated with each other to open in response to fault current depending on its location along the first feeder. The system further includes a plurality of normally closed switches electrically coupled along the first and second feeders between each adjacent pair of normally closed reclosing devices, each switch including one or more current and voltage sensors for measuring current on the first or second feeder and measuring voltage on the first or second feeder at both sides of the switch, where each switch is assigned a position code having a value for each of the first, second and third power sources that determines when the switch will open in response to the fault current and which power source the switch is currently receiving power from, and where timing control between reclosing devices and the switches allows the switch to be selectively opened to isolate the fault within a single feeder section between each pair of adjacent switches or between each switch and a reclosing device.

Additional features of the disclosure will become apparent from the following description and appended claims, taken in conjunction with the accompanying drawings.

DETAILED DESCRIPTION OF THE EMBODIMENTS

Figure 1:
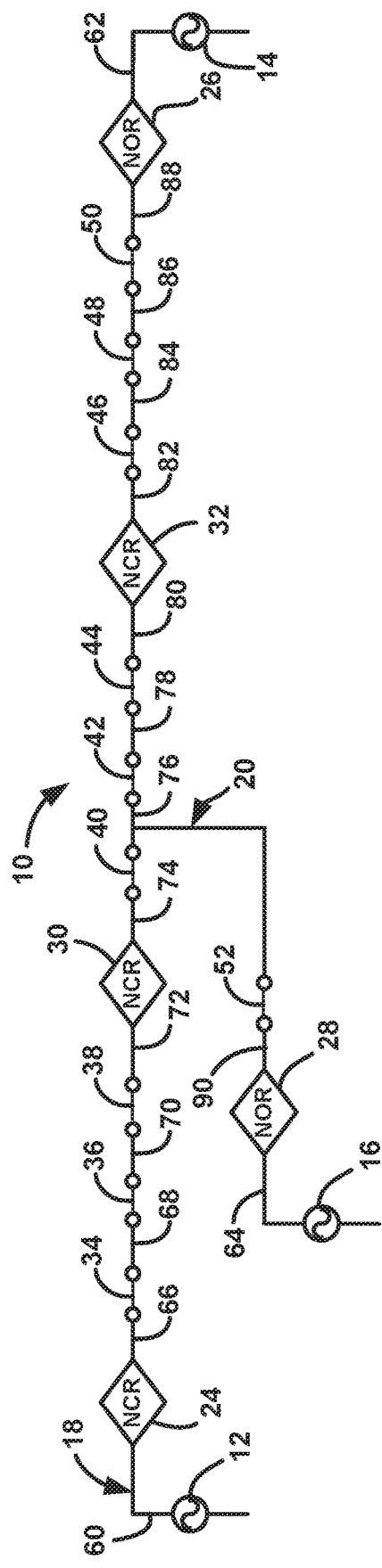
FIG. 1 is a simplified schematic illustration of an electrical power distribution network showing a power restoration system including reclosers and switches.

The following discussion of the embodiments of the disclosure directed to a power restoration system for restoring power to as many feeder sections as possible in an electrical power distribution network in response to a fault, where the system does not require communications, is merely exemplary in nature, and is in no way intended to limit the invention or its applications or uses.

This disclosure proposes a power restoration system that does not rely on communications between reclosers and other switching devices. The power restoration system employs a combination of reclosers and a set of three switches between adjacent reclosers, where both the switches and the reclosers are used to isolate the faulted section of the feeder. In general, for a first embodiment, the system works using a recloser closest to a fault as the device that clears the initial fault, then tests for a permanent fault using reclosing or pulse testing techniques. If the fault is downstream of the recloser and downstream of a switch in the section, the switch closest to the fault that senses fault current will open using fault counts and the timing of the recloser pulse sequence. After a normally closed recloser disconnects the fault from the normally closed side, often using a switch, the normally open recloser will begin its restoration with a delay that allows the normally closed recloser to finish. Then, the normally open recloser will test for a fault, and if it finds no fault, it will close. The next recloser will then detect good voltage on one side and after a delay will test for a fault. When a fault is detected, reclosing or pulse testing will determine if the fault still exists and allow a switch to isolate the fault, then it will restore the remaining distribution system. If the fault clears at any time, the system will stop testing and close the recloser that was doing the testing.

If a second fault occurs, the recloser will open to clear the fault, and begin testing. A switch or recloser adjacent to the fault will open. If there is a possibility of power from the other side of the faulted line section, another recloser will test the line and find the other side of the second fault and the adjacent switch will open.

In a second embodiment, the power restoration system uses the same TCC curve in the reclosers for both the first and second faults so all of the reclosers that are exposed to the fault current will open. This results in a higher momentary average interruption frequency index (MAIFI) than the embodiment that uses TCC curves coordinated for the original fault only, and the embodiment that will have coordinated TCC curves in both directions. The advantage of this embodiment is that it is simple to configure as each recloser is configured with the same TCC curve.

In a third embodiment, the power restoration system uses a different set of TCC curves for the second fault so that only the recloser closest to the second fault will open. This results in a lower MAIFI than the embodiment that only uses TCC curves coordinated for the original fault, or the method that uses all of the same TCC curves.

Some terminology as used herein is defined as follows. An arm pulse occurs when a switch or recloser sees a fault of a duration that corresponds with a very fast opening of a recloser. Fast close/open tests are several cycle over current events and are the shortest non-pulse close operation. For a "condition is not true" state, a switch will evaluate which upstream device is testing based on a run timer, where if the set of pulses and the pulse number for the switch to open are not the same, the condition is not true. For a "condition is true" state, a switch will evaluate which upstream device is testing based on the run timer. If the set of pulses and the pulse number for the switch to open are the same, the condition is true. A double zero condition occurs if the voltage sensors on both sides of a recloser is below 5% and a no voltage sag condition occurs if the voltages are over 75%.

FIG. 1 is a schematic type diagram of an electrical power distribution network 10 that employs a power restoration system and method as described herein. The network 10 includes three AC power sources 12, 14 and 16, such as electrical substations that step down high voltage power from a high voltage power line (not shown) to a medium voltage power line. The power sources 12 and 14 are at opposite ends of a three-phase feeder 18 and the power source 16 is at an end of a three-phase feeder 20 opposite to where the feeder 20 is tapped off of the feeder 18. The network 10 includes a normally closed recloser (NCR) 24 adjacent to the source 12, a normally open recloser (NOR) 26 adjacent to the source 14, a normally open recloser 28 adjacent to the source 16 and two normally closed reclosers 30 and 32 on the feeder 18 between the reclosers 24 and 26. Because the reclosers 24, 30 and 32 are normally closed and the reclosers 26 and 28 are normally open, all of the loads (not shown) along the feeders 18 and 20 are serviced by the source 12 during normal operation. Three switches 34, 36 and 38 are provided along the feeder 18 between the reclosers 24 and 30, three switches 40, 42 and 44 are provided along the feeder 18 between the reclosers 30 and 32, three switches 46, 48 and 50 are provided along the feeder 18 between the reclosers 32 and 26, and a switch 52 is provided on the feeder 20 between the recloser 28 and the location where the feeder 20 is tapped off of the feeder 18 between the switches 40 and 42. The reclosers 24-32 and the switches 34-52 would all likely be mounted on utility poles, where the span length between adjacent reclosers 24-32 is typically miles.

The feeders 18 and 20 have a number of feeder segments between adjacent devices in the network 10, such as the sources 12, 14 and 16, the reclosers 24-32 and the switches 34-52. In this example, a feeder segment 60 is provided and defined between the source 12 and the recloser 24, a feeder segment 62 is provided and defined between the source 14 and the recloser 26, a feeder segment 64 is provided and defined between the source 16 and the recloser 28, a feeder segment 66 is provided and defined between the recloser 24 and the switch 34, a feeder segment 68 is provided and defined between the switches 34 and 36, a feeder segment 70 is defined between the switches 36 and 38, a feeder segment 72 is defined between the switch 38 and the recloser 30, a feeder segment 74 is defined between the recloser 30 and the switch 40, a feeder segment 76 is defined between the switches 40, 42 and 22, which is the tap location of the feeder 20, a feeder segment 78 is defined between the switches 42 and 44, a feeder segment 80 is provided and defined between the switch 44 and the recloser 32, a feeder segment 82 is provided and defined between the recloser 32 and the switch 46, a feeder segment 84 is provided and defined between the switches 46 and 48, a feeder segment 86 is defined between the switches 48 and 50, a feeder segment 88 is provided and defined between the switch 50 and the recloser 26, and a feeder segment 90 is provided and defined between the recloser 28 and the switch 52. It is noted that in the system 10 the normally open reclosers 26 and 28 are place near the sources 14 and 16, respectively. However, this is merely for illustrative purposes in that in a real system there would likely be many reclosers between alternate sources and any normally open reclosers.

Figure 2:
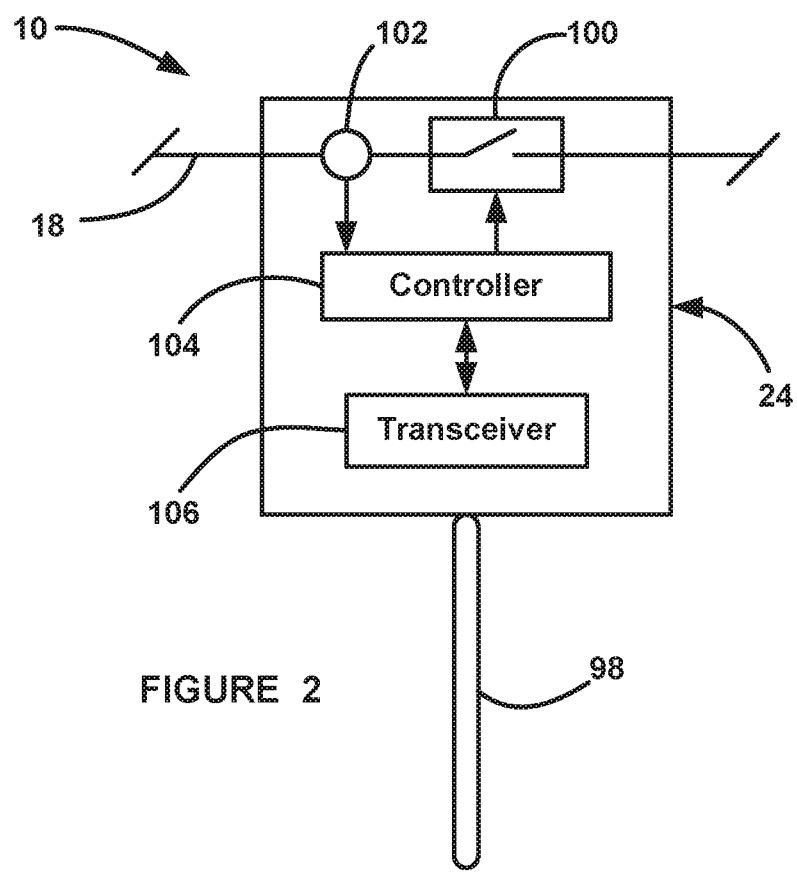
FIG. 2 is a simplified illustration of a recloser in the electrical power distribution network shown in FIG. 1.

The reclosers 24-32 and the switches 34-52 are all able to measure voltage and current on the feeder 18 or 20, and the reclosers 24-32 are able to provide fault clearing as well as optionally using known testing techniques, but the switches 34-52 are not able to provide fault clearing or testing. FIG. 2 is a simplified illustration of the recloser 24 mounted on a utility pole 98 with the understanding that the reclosers 26-32 are the same or similar. The recloser 24 includes a relay or interrupter switch 100 for opening and closing the recloser 24 to allow or prevent current flow therethrough on the feeder 18. The recloser 24 also includes sensors 102 that are intended to represent one or more current and voltage sensors for measuring the current and voltage of the power signal propagating on the feeder 18 on one side of the switch 100, and voltage on both sides of the switch 100, a controller 104 for processing the measurement signals and controlling the position of the switch 100, and an optional transceiver 106 for transmitting data and messages to a control facility (not shown) and/or to other reclosers, fault interrupters and components in the network 10. The configuration and operation of fault reclosers of this type are well understood by those skilled in the art.

Figure 3:
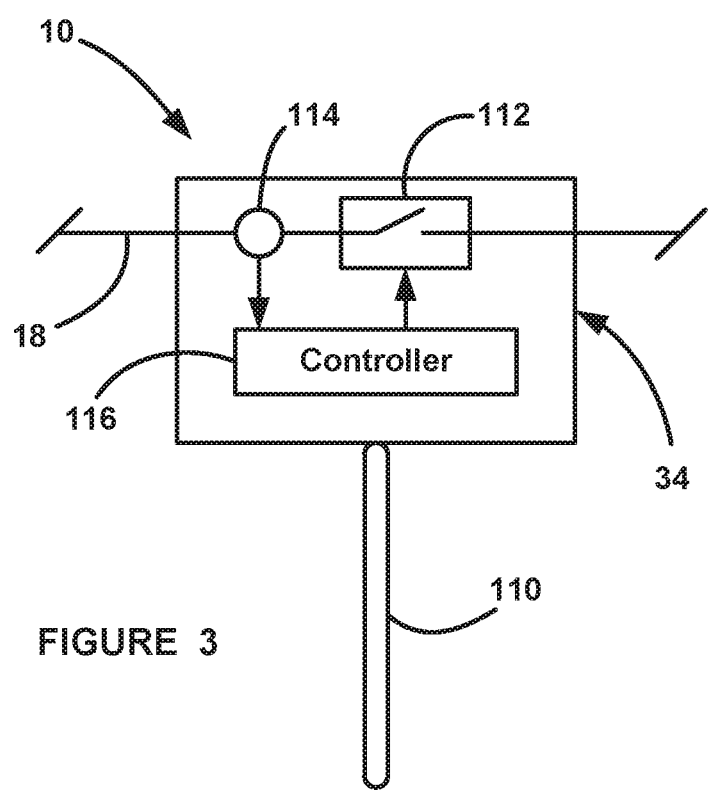
FIG. 3 is a simplified illustration of a switch in the electrical power distribution network shown in FIG. 1.

FIG. 3 is a simplified illustration of the switch 34 mounted on a utility pole 110 with the understanding that the switches 36-52 are the same or similar. The switch 34 includes an automatic open operator for a switch 112 and a manual or automatic closing the switch 34 to allow or prevent current flow therethrough on the feeder 18. The switch 34 also includes sensors 114 that are intended to represent one or more current or voltage sensors for measuring the voltage of the power signal propagating on the feeder 18 on both sides of the switch 112 and current on one side of the switch 112, and a controller 116 for processing the measurement signals and controlling the position of the switch 112, where the controller 116 includes a counter 118 for reasons that will become apparent from the discussion below.

The reclosers 24-32 can provide fault clearing and optionally testing using known testing technologies as discussed above. In this design, each of the switches 34-52 is assigned a set of number values, and each value determines when the switch 34-52 will open depending on which of the sources 12, 14 or 16 is providing the power in response to detecting a fault. Each time the switch 34-52 first detects fault current it becomes armed. Each time the switch 34-52 detects fault current again during the testing procedure it increments a counter, and when the counter reaches the assigned value for the particular power source 12, 14 or 16, the switch 34-52 opens. Therefore, each time one of the reclosers 24, 30 and 32 detects fault current it will open and close or optionally pulse close thereafter to determine if the fault is still present. Each switch 34-52 along the fault path will also detect the fault current when it initially occurs and each time the recloser 24-32 closes or pulse closes if the fault is still present. By assigning a higher value to the switch 34-52 closest to the recloser 24-32 and a lower value to the switch 34-52 farthest from the recloser 24-32, the farther switches 34-52 will open first, thus allowing the first switch 34-52 upstream of the fault to open and limit the segments 60-90 of the feeders 18 and 20 that are affected by the fault. The number of three switches between reclosers is selected because generally the number of re-close or tests that are performed is four before the particular recloser 24-32 is maintained open if the fault is still present.

Since there are three sources 12, 14 and 16 in the system 10, the switches 24-32 are each assigned a three digit code where the position of the digit in the code is the assigned value for each of the sources 12, 14 and 16. For the power restoration system discussed herein, the first digit in the code is for when power is being supplied by the source 12, the second digit in the code is for when power is being supplied by the source 14, and the third digit in the code is for when power is being supplied by the source 16. In this non-limiting example, the switch 34 is assigned code 311, the switch 36 is assigned code 222, the switch 38 is assigned code 133, the switch 40 is assigned code 311, the switch 42 is assigned code 222, the switch 44 is assigned code 131, the switch 46 is assigned code 313, the switch 48 is assigned code 222, the switch 50 is assigned code 131 and the switch 52 is assigned code 113.

Figure 4:
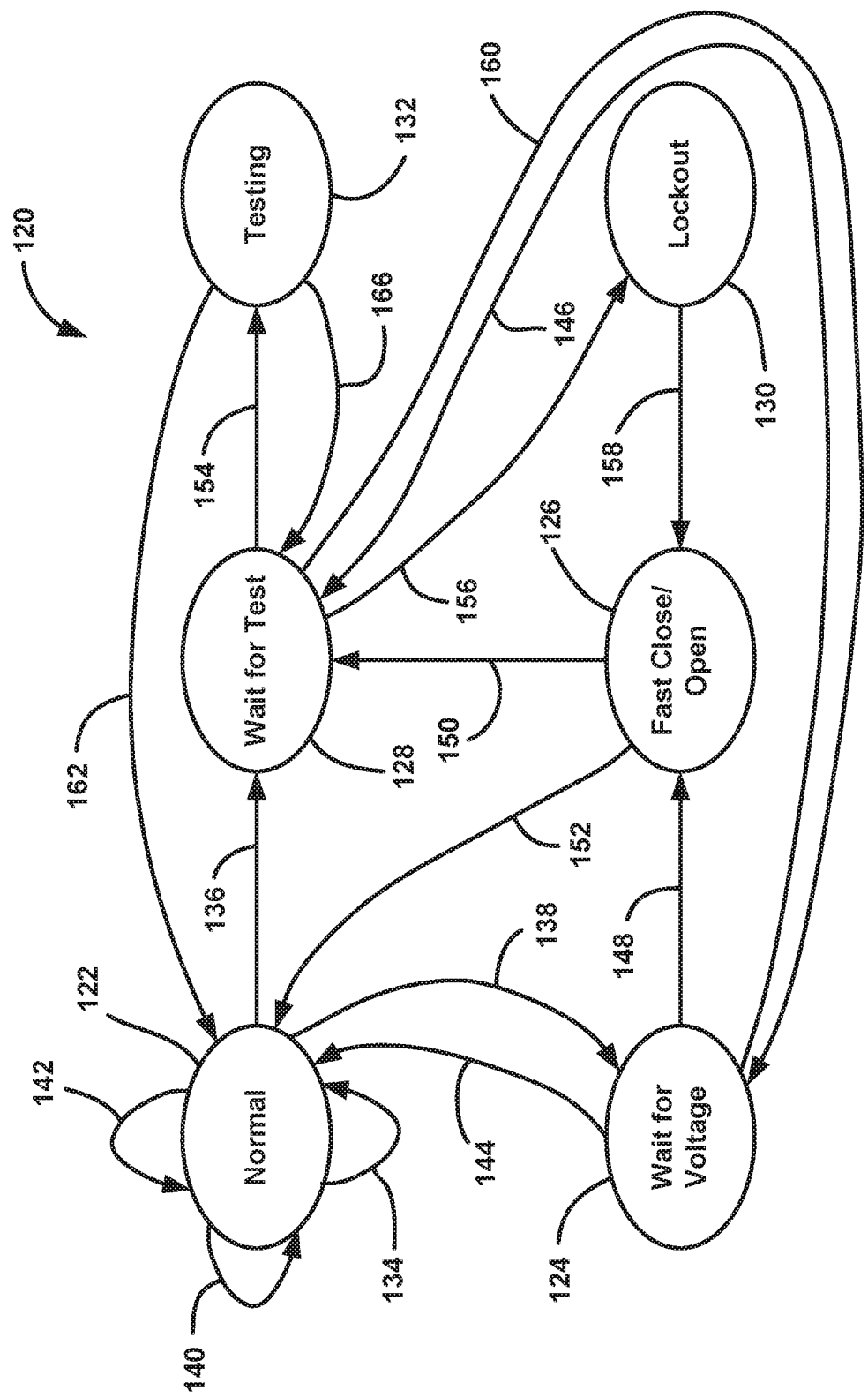
FIG. 4 is a state diagram for the normally closed reclosers in the network shown in FIG. 1 for a power restoration process.

FIG. 4 is a state diagram 120 for the normally closed reclosers 24, 30 and 32 showing the six possible states that they can be in at any particular point in time based on the discussion herein. These states include a "normal" state at oval 122 where the recloser 24, 30 or 32 is closed, a "wait for voltage" state at oval 124 where the recloser 24, 30 or 32 is open and the run timer is off, a "fast close/open" state at oval 126 where the recloser 24, 30 or 32 is closed and the run timer is on, a "wait for test" state at oval 128 where the recloser 24, 30 or 32 is open and the arm pulse is off, a "lockout" state at oval 130 where the recloser 24, 30 or 32 is open and the run timer is off, and a "testing" state at oval 132 where the recloser 24, 30 or 32 is closed and then opened.

Each state is running a loop sequence algorithm that makes sequential and repeated determinations of whether the recloser 24, 30 or 32 should move to another state or remain in the state it is in, where if a condition is true, the arrows from one state to another state indicate what state the recloser 24, 30 or 32 moves to. If the recloser 24, 30 or 32 does transition to another state, then the process returns to the first determination when the recloser 24, 30 or 32 transitions back to that state.

In the "normal" state 122 the recloser 24, 30 or 32 is closed. When the recloser 24, 30 or 32 is in the "normal" state 122 the algorithm first determines if there is a voltage sag with the run timer off and, if so, turns the run timer on, but remains in the "normal" state represented by line 134. The algorithm then determines whether fault current has been detected by the recloser 24, 30 or 32 for the TCC curve and delay time for the recloser 24, 30 or 32, where, if so, moves the recloser 24, 30 or 32 to the "wait for test" state 128 on line 136. If there is no detected fault current, then the algorithm determines whether there is no voltage on both sides of the recloser 24, 30 or 32 and the run timer has exceeded the pulse sequence time and, if so, moves the recloser 24, 30 or 32 to the "wait for voltage" state 124 on line 138. If there is voltage in the "normal" state 122, the algorithm then determines if there has been voltage for a certain period of time and, if so, turns the run timer off and the arm pulse off and stays in the "normal" state 122 on line 140. The algorithm then determines if there has been fault current for the TCC time with the run timer on and, if so, sets the arm pulse, and stays in the "normal" state 122 on line 142.

In the "wait for voltage" state 124 the recloser 24, 30 or 32 is open. When the recloser 24, 30 or 32 is in the "wait for voltage" state 124, the algorithm first determines if there has been no voltage sag for a certain period of time and, if so, returns to the "normal" state 122 on line 144. If there is or has been a voltage sag, then the algorithm determines whether there has been a good voltage for a predetermined period of time, such as two seconds, and the arm pulse is on and, if so, moves the recloser 24, 30 or 32 to the "wait for test" state 128 on line 146. If there is no voltage sag, then the algorithm determines whether there has been a good voltage for two seconds and the arm pulse is off and, if so, moves the recloser 24, 30 or 32 to the "fast close/open" state 126 on line 148.

In the "fast close/open" state 126 the recloser 24, 30 or 32 closes then opens quickly. When the recloser 24, 30 or 32 is in the "fast close/open" state 126, the algorithm first determines if fault current is present while the recloser 24, 30 or 32 is closed and, if so, moves the recloser 24, 30 or 32 to the "wait for test" state 128 on line 150. If this is not occurring, the algorithm then determines that no fault current is present and the fast close/open is done and, if so, moves the recloser 24, 30 or 32 to the "normal" state 122 on line 152.

In the "wait for test" state 128 the recloser 24, 30 or 32 is open. When the recloser 24, 30 or 32 is in the "wait for test" state 128, the algorithm first determines if the run timer is equal to pulse 1, 2, 3 or 4 and, if so, moves the recloser 24, 30 or 32 to the "testing" state 132 on line 154. If the run timer is not equal to 1, 2, 3 or 4, the algorithm determines if the run timer is done and, if so, moves the recloser 24, 30 or 32 to the "lockout" state 130 on line 156. Also, if both sides of the recloser 24, 30 or 32 are at zero voltage, then the recloser 24, 30 or 32 moves to the "wait for voltage" state 124 on line 160.

In the "lockout" state 130 the recloser 24, 30 or 32 is open. When the recloser 24, 30 or 32 is in the "lockout" state 130, the algorithm determines if there is a reset of the recloser 24, 30 or 32 and, if so, moves the recloser 24, 30 or 32 to the "fast close/open" state 126 on line 158.

In the "testing" state 132 the recloser 24, 30 or 32 first closes then quickly opens, or pulses the recloser 24, 30 or 32. When the recloser 24, 30 or 32 is in the "testing" state 132, the algorithm first determines if while the recloser 24, 30 or 32 is closed fault current is still being detected and, if so, moves the recloser 24, 30 or 32 back to the "wait for test" state 128 on line 166. If the fault current is not detected while the recloser 24, 30 or 32 is closed, the algorithm determines that the fault is cleared and moves the recloser 24, 30 or 32 to the "normal" state 122 on line 162.

Figure 5:
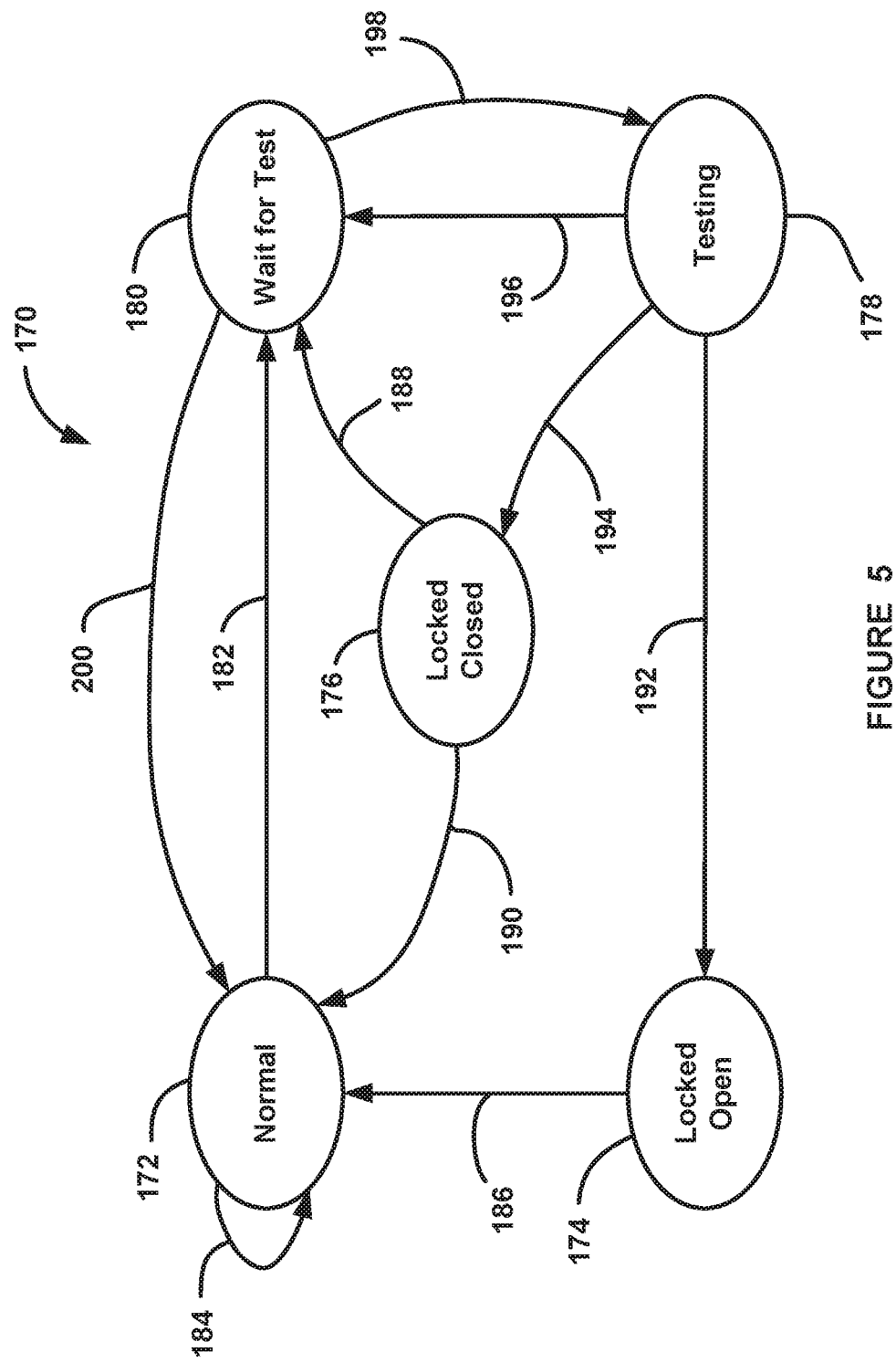
FIG. 5 is a state diagram for the normally open reclosers in the network shown in FIG. 1 for the power restoration process.

FIG. 5 is a state diagram 170 for the normally open reclosers 26 and 28, which have five states that they can be in at any particular point in time based on the discussion above. These states include the "normal state" at oval 172 where the recloser 26 or 28 is open, a "locked open" state at oval 174 where the recloser 26 or 28 is open and the run timer is off, a "locked closed" state at oval 176 where the recloser 26 or 28 is closed and the run timer is off, a "testing" state at oval 178 where the recloser 26 or 28 is closed then opened after an arm pulse, and the "wait for test" state at oval 180 where the recloser 26 or 28 is open and the run timer is on.

In the "normal" state 172 the recloser 26 or 28 is open. When the recloser 26 or 28 is in the "normal" state 172, the algorithm first determines whether there is voltage sag and, if so, moves the recloser 26 or 28 to the "wait for test" state 180 on line 182. If there is no voltage sag for 200 ms and the run timer is off, the algorithm maintains the recloser 26 or 28 in the "normal" state 172 on line 184.

In the "locked open" state 174 the recloser 26 or 28 closes then quickly opens. When the recloser 26 or 28 is in the "locked open" state 174, a forced reset of the recloser 26 or 28 returns the recloser 26 or 28 to the "normal" state 172 on line 186.

In the "locked closed" state 176 the recloser 26 or 28 is closed. When the recloser 26 or 28 is in the "locked closed" state 176, the algorithm first determines if fault current is present and the recloser 26 or 28 has reached its TCC curve and the arm pulse is complete and, if so, moves the recloser 26 or 28 to the "wait for test" state 180 on line 188. If this is not occurring, the recloser 26 or 28 can be manually reset back to the "normal" state 172 on line 190.

In the "testing" state 178 the recloser 26 or 28 closes then quickly opens. When the recloser 26 or 28 is in the "testing" state 178, the algorithm first determines if the run timer has reached the last pulse and there is fault current and, if so, moves the recloser 26 or 28 to the "locked open" state 174 on line 192. If these decisions are not occurring, the algorithm then determines if there is fault current and, if so, moves the recloser 26 or 28 to the "wait for test" state 180 on line 194. If there is no fault current, then the algorithm moves the recloser 26 or 28 to the "locked closed" state 176 on line 196.

In the "wait for test" state 180 the recloser 26 or 28 is open. When the recloser 26 or 28 is in the "wait for test" state 180, the algorithm first determines if the run timer is equal to the arm pulse times and the arm tests are complete and, if so, moves the recloser 26 or 28 to the "testing" state 178 on line 198. If there is no voltage sag for 500 ms, the algorithm moves the recloser 26 or 28 to the "normal" state 172 on line 200.

Figure 6:
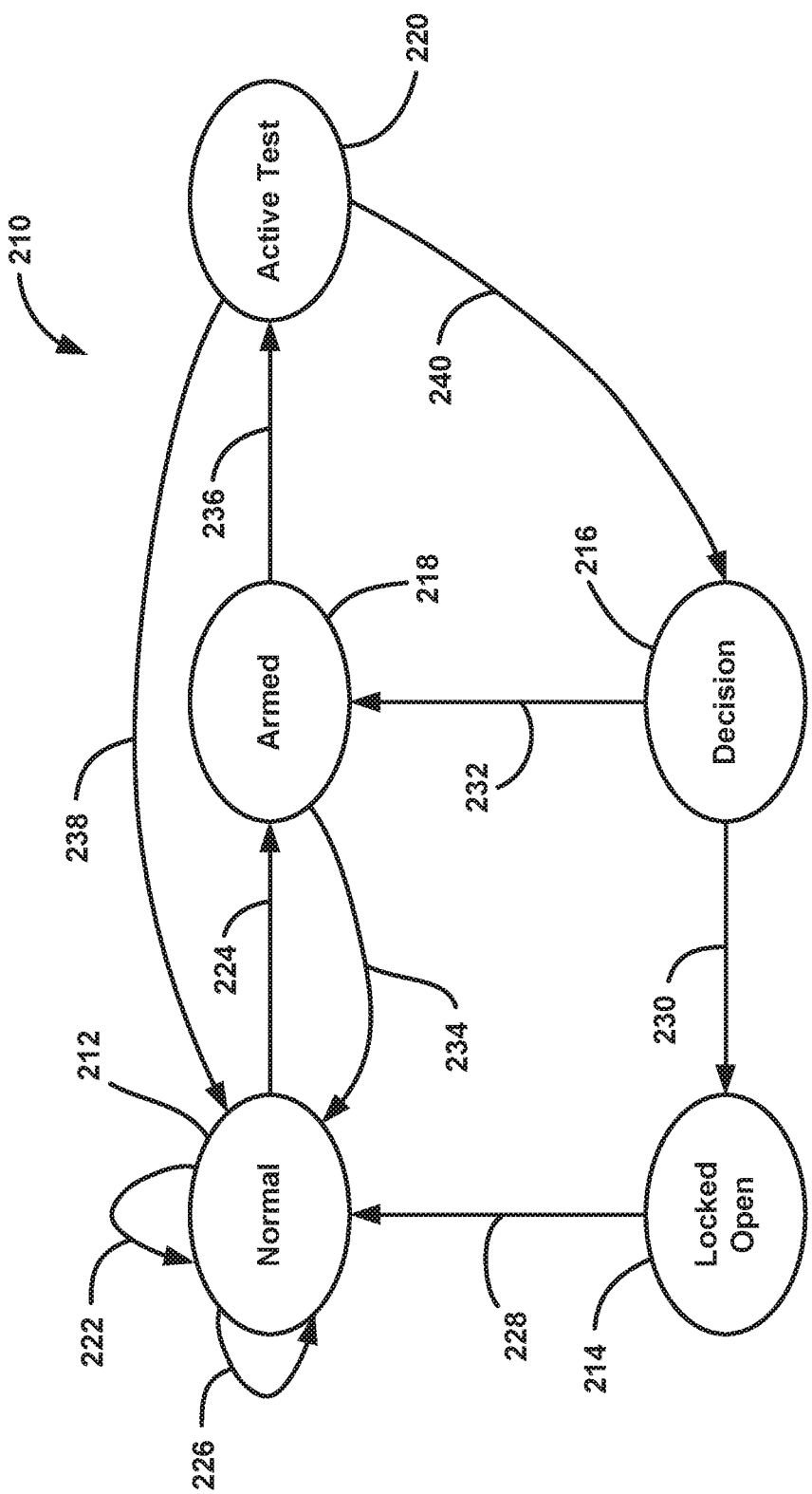
FIG. 6 is a state diagram for the normally closed switches in the network shown in FIG. 1 for the power restoration process.

FIG. 6 is a state diagram 210 for the switches 34-52, which have five states that it can be in at any particular point in time. These states include the "normal" state at oval 212 where the switch 34-52 is closed, a "locked open" state at oval 214 where the switch 34-52 is open and the run timer is off, an "armed" state at oval 216 where the switch 34-52 is closed and is ready to count pulses, a "decision" state at oval 218 where the switch 34-52 is closed and is determining whether it should open when its value is reached, and an "active test" state at oval 220 where the switch 34-52 is closed and is counting pulses.

In the "normal" state 212 the switch 34-52 is closed. When the switch 34-52 is in the "normal" state 212, the algorithm first determines if there is voltage sag and the run timer is off and, if so, turns the run timer on and maintains the "normal" state on line 222. If the run timer is on, the algorithm determines if fault current is present and, if so, moves the switch 34-52 to the "armed" state 226 on line 224.

In the "locked open" state 214 the switch 34-52 is open. When the switch 34-52 is in the "locked open" state 214, the switch 34-52 can be manually reset and the run timer turned on and the switch 34-52 is returned to the "normal" state 212 on line 226.

In the "decision" state 216 the switch 34-52 is closed. When the switch 34-52 is in the "decision" state 216, the algorithm determines if the first position value matches the pulse number and the process is in the first set of pulses, and the condition is true causing the algorithm to move the switch 34-52 to the "locked open" state 214 on line 228. Or, when the second position value matches the pulse number and the process is in the second set of pulses, the condition is also true and the algorithm moves the switch 34-52 to the "locked open" state 214 on the line 228. Finally, when the third position value matches the pulse number and the process is in the third set of pulses, the condition is also true and the algorithm moves the switch 34-52 to the "locked open" state 214 on the line 228. If the condition is not true, the algorithm moves the switch 34-52 back to the "armed" state 218 on line 230.

In the "armed" state 218 the switch 34-52 is closed. When the switch 34-52 is in the "armed" state 218, the algorithm determines if the reset timer has elapsed or there is no voltage sag and, if so, the algorithm moves the switch 34-52 back to the "normal" state 212 on line 232. The algorithm then determines if there is a possible test and, if so, moves the switch 34-52 to the "active test" state 220 on line 234.

In the "active test" state 220 the switch 34-52 is closed. When the switch 34-52 is in the "active test" state 220, the algorithm first determines if there is no voltage sag and, if so, moves the switch 34-52 to the "normal" state 212 on line 236. If there is voltage sag, the algorithm waits for a 500 ms delay to see if the voltage sag remains and, if so, moves the switch 34-52 to the "decision" state 216 on line 238.

In the first embodiment referred to above, the reclosers 24, 30 and 32 are coordinated using suitable TCC curves so that the recloser 32 opens before the recloser 30 and the recloser 30 opens before the recloser 24. For example, the recloser 24 may have a TCC delay value of 4, the recloser 30 may have a TCC delay value of 3 and the recloser 32 may have a TCC delay value of 2. The recloser is 26 coordinated with a first delay and a TCC curve that is faster than the TCC curve of the recloser 32, for example, a TCC delay value of 1, so that it will perform fault testing after the reclosers 24, 30 and 32 have had time to perform a set of fault testing pulses. The recloser 28 is coordinated with a second delay that is longer than the first delay and a TCC curve that is the same as the TCC curve of the recloser 26 so that it will perform fault testing after the recloser 26.

All of the reclosers 24-32 are in the "normal" states 122 or 172 if no fault current or voltage sag is detected. If a fault occurs in, for example, the feeder segment 70, fault current will run along the fault path from the source 12, through the recloser 24, through the switches 34 and 36 and into the fault. All of the downstream switches 38-52 and the reclosers 26, 28, 30 and 32 from the segment 70 do not see the fault current, but experience loss of voltage. All of the reclosers 24-32 and all of the switches 38-52 first start the run timer when they detect a large enough voltage drop. The reclosers 26 and 28 will detect voltage sag and move to the "wait for test" state 180 and remain open. In response to detecting the fault current, when the slower TCC value of the recloser 24 is reached it will also move to the "wait for test" state 128 and will open, which removes power from the feeders 18 and 20 because the reclosers 26 and 28 are also open. The switches 34 and 36 also detect the fault current and move to the "armed" state 218. The recloser 24 will then move to the "testing" state 132 for testing to determine if the fault is still present, and then return back to the "wait for test" state 128. When the recloser 24 is tested, the switches 34 and 36 move to the "active test" state 220. If the fault is not present, the reclosers 24-32 and the switches 34-52 all return to the "normal" states 122, 172 and 212. In response to detecting the original fault current and being armed, and then detecting the fault current again during the testing, the switches 34 and 36 will move to the "decision" state 216 to increment their counter to 1 and determine if their count value has been reached and, if not, return to the "armed" state 218. The recloser 24 then will go back to the "testing" state 132 for a second time and if the fault current is still present, and the switches 34 and 36 will again move to the "active test" state 220 and the "decision" state 216. Since the switch 34 is assigned value 3 for the power source 12, it remains closed and armed. However, since the switch 36 is assigned value 2 for the power source 12 it will move to the "locked open" state 214 and the recloser 24 will return to the "normal" state 122 and stay closed since the fault current has been removed by the switch 36 after being opened, and thus power will be provided to feeder segments 66 and 68 from the source 12.

Once the segment 70 has been isolated from the source 12 from the open switch 36, all of the segments 72-90 downstream of the segment 70 are also isolated and not receiving power. The power restoration system then proceeds to isolate the segment 70 at its downstream side and provide power to the downstream segments 72-90 from the segment 70. When the switch 36 opens, and a certain run time has elapsed, the reclosers 30 and 32 will move to the "wait for voltage" state 124 and open because they have not seen any voltage on both sides of the reclosers 30 and 32, and will stay in that state until voltage is restored. As mentioned above, the reclosers 24 and 26 are coordinated with a delay so that the reclosers 26 and 28 do not operate until after the reclosers 24, 30 and 32 go through their fault interrupting operation, where the recloser 26 operates on a run time delay that is shorter than the run time delay that the recloser 28 operates on.

When the delay time of the recloser 26 elapses and the recloser 26 does not see any voltage at its formerly upstream side, it will move to the "locked closed" state 176. When the recloser 26 closes power is restored to the segments 82, 84, 86 and 88 from the power source 14. When the recloser 32 detects voltage at it formerly downstream side, but now upstream side, it will go into the "fast close/open" state 126 to test and detect fault current, and since no fault current is present, the recloser 32 will move to the "normal" closed state 122, and power will be restored to the segments 74, 76, 78, 80 and 90. Also, the recloser 28 no longer detects a voltage sag and moves back to the "normal" open state 172. When the recloser 30 is in the "wait for voltage" state 124 and the recloser 32 closes, the recloser 30 detects voltage at it formerly downstream side, but now upstream side, and it will also go into the "fast close/open" state 126 to test and look for fault current. However, in this case the recloser 30 detects fault current from the fault in the segment 70, and will move to the "wait for test" state 128 and then perform the testing between the "wait for test" state 128 and "testing" state 132 and the switch 38 will be armed and move between the "active test" state 220 and the "decision" state 216 during the testing, as described. The counter value of the switch 38 for the source 14 is 3, so that when the testing causes the switch 38 to reach this value, it will move to the "locked open" state 214 to completely isolate the fault in the segment 70, and the recloser 30 will move to the "normal" state 122, where power is restored to the segment 72 from the source 14. In this configuration, the smallest possible section of the feeder 18 is without power, only in the segment 70, and no communication was required between the switches 34-52 and the reclosers 24-32 to accomplish that. Once the fault is found and the damage repaired, the switches 36 and 38 are manually closed and their run timers are reset to return to the "normal" state 212. The recloser 26 is then reset and returns to the "normal" state 122.

Figure 7:
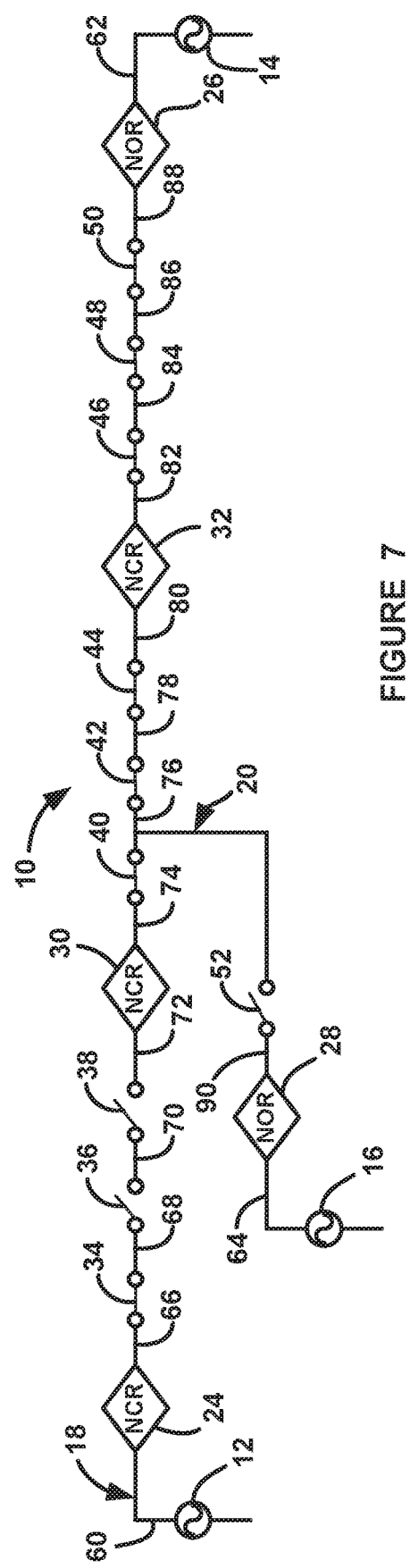
FIG. 7 is the schematic illustration of the electrical power distribution network shown in FIG. 1 with switches opened to isolate a fault.

With the network 10 in the fault isolation configuration as described before the damage is repaired, another fault could occur in the feeder 18 or 20 that also needs to be isolated. For example, a fault may occur in the segment 90, where the recloser 26 would open in response to the fault because it has a shorter TCC value than the recloser 32, and the reclosers 26 and 28 would move to the "wait for test" state 128 because of the voltage sag to perform testing, where power is removed from the segments 72-90. Also, the switches 42-52 move to the "armed" state 218. With no voltage on either side, the reclosers 30 and 32 open and move to the "wait for voltage" state 124. The recloser 26 moves to the "fast close/open" state 126 for testing and sees no fault current, and thus moves to the "locked closed" state 176, which causes the switches 46, 48 and 50 to return to the "normal" state 212 because they now receive voltage from the source 14, and power is restored to the segments 82, 84, 86 and 88. The recloser 32 has voltage on its upstream side from the power source 14, and thus moves to the "fast/open close" state 126, the "wait for test" state 128 and the "testing" state 132 to perform testing, which causes the switch 52 to detect the testing and move from the "armed" state 218 to the "active test" state 220 to the "decision" state 216 and then to the "locked open" state 214 when its value of 1 for the power source 14 is reached. The recloser 32 then does not detect the fault current and moves to the "normal" closed state 122, which restores power to the segments 74, 76, 78 and 80, thus isolating the fault in the segment 90. The recloser 30 then detects that voltage has been restored at its upstream side and moves to the "fast close/open" state 126 to perform testing, sees no fault current, and then moves to the "normal" state 122, which restores power to the segment 72. Further, when the recloser 28 sees no voltage it moves to the "testing" state 178 and then to the "locked open" state 174. FIG. 7 is the network 10 with the switches 36, 38 and 52 open and the faults isolated in the segments 70 and 90.

Figure 8:
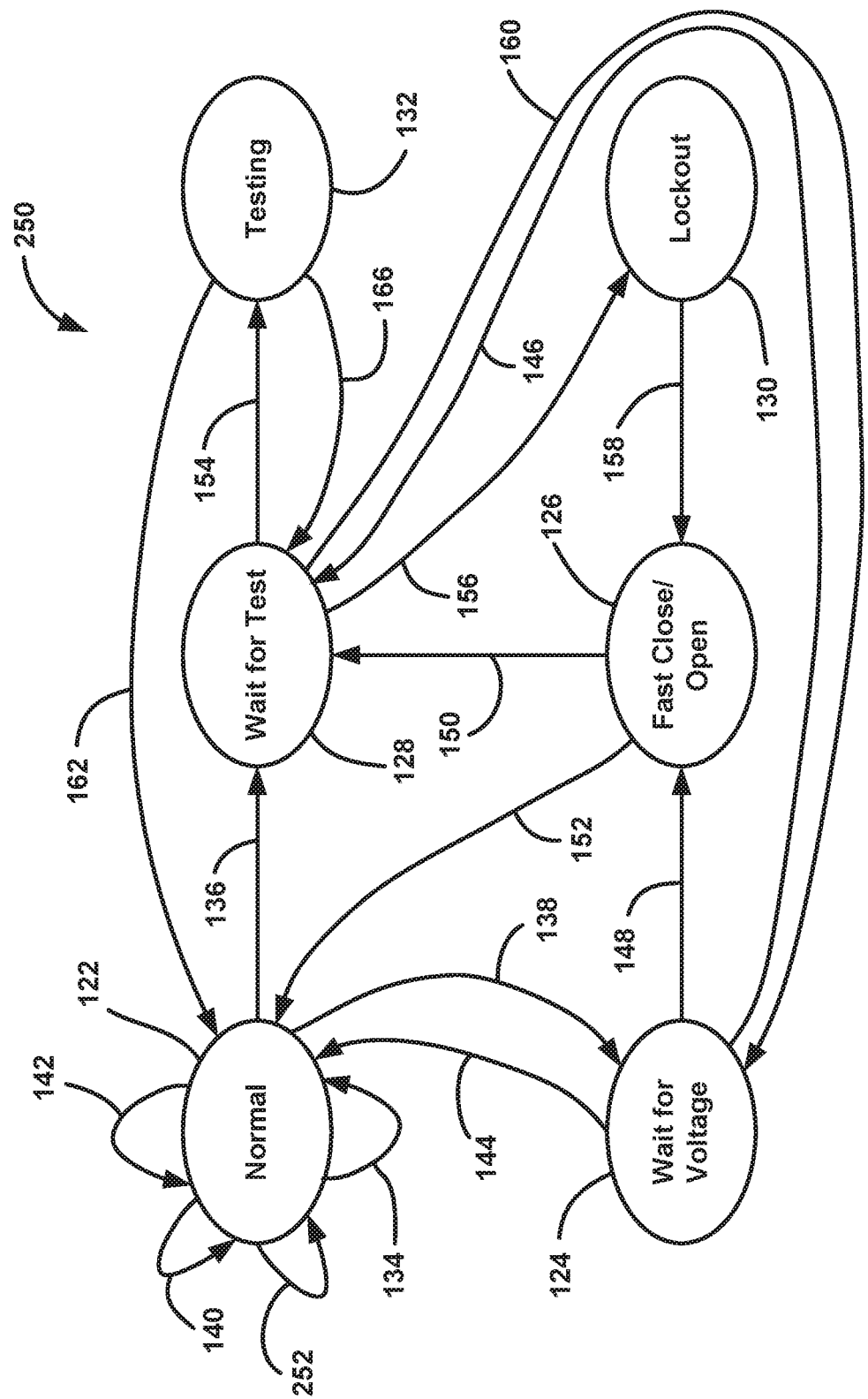
FIG. 8 is a state diagram for the normally closed reclosers in the network that is similar to the state diagram shown in FIG. 4 for another embodiment.

In the second embodiment referred to above, all of the reclosers 24-32 have the same TCC value, for example, each has a TCC value of 2, which makes the power restoration system easier to set up than the first embodiment in that each recloser 24-32 doesn't need as much timing coordination with the other reclosers 24-32. The reclosers 26 and 28 still have the same delay as discussed above before operating their power restoration process. Also, the state diagrams for the normally open reclosers 26 and 28 and the switches 34-52 for the second embodiment are the same as the state diagrams 170 and 210, respectively. The state diagram for the normally closed reclosers 24, 30 and 32 for the second embodiment is similar to the state diagram 140 for the first embodiment and is shown in FIG. 8 as state diagram 250, where like elements to the state diagram 140 are identified by the same reference number. The sixth and last operation that is performed at the "normal" state 122 is a reset on line 252 when the TCC curve is 1 and the arm pulse is off. Further for the line 160, a delay is added based on the TCC curve selected.

In this embodiment, if there is a fault in the segment 78, the recloser 24 detects the fault current and moves to the "wait for test" state 128 and opens. The recloser 30 detects the fault current and moves to the "wait for test" state 128 and opens. Then, since there is no voltage on either side, the recloser 30 moves to the "wait for voltage" state 124. The recloser 32 also detects no voltage on either side, moves to the "wait for voltage" state 124 and opens. The recloser 26 detects voltage only on one side from the source 14, moves to the "wait for test" state 180 and remains open. The recloser 28 detects voltage only on one side from the source 16, moves to the "wait for test" state 180 and remains open. The switches 34, 36, 38, 40 and 42 also detect the fault current and move to the "armed" state 212. The recloser 24 moves to the "testing" state 132 to perform testing and when the recloser 24 does not detect fault current because the recloser 30 is open, it and the switches 34, 36 and 38 will go back to the "normal" closed states 122 and 212, thus restoring power to the segments 66, 68, 70 and 72. With voltage on one side, the recloser 30 will move to the "fast close/open" state 126 closing then opening to look for a continuing fault. Then the recloser 30 will perform testing by moving between the "wait for test" state 128 and the "testing" state 132. During the testing, the switch 42 moves between the "active test" state 220 and the "decision" state 216 and once it reaches its value for the source 12, as discussed above, will move to the "locked open" state 214. Also, the recloser 28 sees good voltage on both sides and moves to the "normal" open state 172. The recloser 30 will also not detect fault current anymore and move to its "normal" closed state 122, thus restoring power to the segments 74, 76 and 90. The recloser 26 is still in the "wait for test" state 180 and performs testing when its delay is reached at the "testing" state 178, doesn't detect fault current, and moves to the "locked closed" state 176, thus restoring power to the segments 82, 84, 86 and 88. The recloser 32 is still in the "wait for voltage" state 124, and when voltage is applied to the recloser 32 it moves to the "fast close/open" state 126 and detects fault current, then moves to the "wait for test" state 128. Testing occurs as the recloser 32 moves between the "wait for test" state 128 and the "testing" state 132. During the testing, the switch 44 moves between the "active test" state 220 and the "decision" state 216 and once it reaches its value for the source 14, as discussed above, will move to the "locked open" state 214, thus restoring power to the segment 80.

If a second fault occurs in the segment 90 as discussed with reference to the first embodiment, the recloser 24 detects the fault current and, moves to the "wait for test" state 128 and opens. The recloser 30 detects the fault current and moves to the "wait for test" state 128 and opens, then when there is no voltage on either side moves to the "wait for voltage" state 124. The recloser 28 detects voltage only on one side from the source 16, moves to the "wait for test" state 180 and remains open. The switches 34, 36, 38, 40 and 52 also detect the fault current and move to the "armed" state 218. The recloser 24 moves to the "testing" state 132 to perform testing and when the recloser 24 does not detect fault current because the recloser 30 is open, it and the switches 34, 36 and 38 will go back to the "normal" closed states 122 and 172, thus restoring power to the segments 66, 68, 70 and 72. The recloser 30 still detects fault current as it moves to the "fast close/open" state 126, and then between the "wait for test" state 128 and the "testing" state 132. During the testing, the switch 52 moves between the "active test" state 220 and the "decision" state 216 and once it reaches its value for the source 12, as discussed above, will move to the "locked open" state 214. The recloser 30 and the switch 40 will not detect fault current anymore and move to their "normal" closed state 122 and 172, thus restoring power to the segments 74, 76 and 90. The recloser 28 is still in the "wait for test" state 180 and performs testing between the "wait for test" state 180 and the "testing" state 178, continues to detect fault current, and moves to the "locked open" state 174.

In the third embodiment referred to above, the power restoration system uses a different set of TCC curves for the second fault so that only the recloser 24-32 closest to the second fault will open, which reduces the momentary power outages. For the network 10 shown in FIG. 1, each of the reclosers 24-32 is assigned a different TCC curve value depending on which direction the power flow is coming from much in the same way as the switches 34-52 are assigned their value. For example, the recloser 24 may be assigned the TCC code 311, the recloser 26 may be assigned the TCC code 131, the recloser 28 may be assigned the TCC code 112, the recloser 30 may be assigned the TCC code 211, and the recloser 32 may be assigned the TCC code 121, where the first value in the code is used when current flow is coming to the recloser from the power source 12, the second value in the code is used when current flow is coming to the recloser from the power source 14, and the third value in the code is used when current flow is coming to the recloser from the power source 16. Also, the state diagram for the normally closed reclosers 24, 30 and 32 for the third embodiment is the same as for the second embodiment as shown in FIG. 8, and the state diagrams for normally open reclosers 26 and 28 and the switches 34-52 is the same as for the first embodiment as shown in FIGS. 4 and 5, respectively.

If a fault occurs in the segment 70 as discussed above for the first embodiment, the procedure for opening the switches 36 and 38 to isolate the fault in the segment 70 is the same as in the first embodiment, except the timing of the procedure is different for the recloser 24 having the TCC value of 3, instead of 4, for current flow from the source 12, where the isolation of the fault will occur quicker. Power is then restored to the segments 72-90 from the power source 14 through the recloser 26, then after a short delay to the recloser 32, and then after another short delay to the recloser 30 causing fault current to flow in the reclosers 30, 32 and 26, where they operate with the TCC values 1, 2 and 3, respectively. Since the recloser 30 is the fastest it opens in reaction to the fault. The recloser 30 after detecting fault current performs testing between the "wait for test" state 128 and the "testing" state 132. The switch 38 moves between the "active test" state 220 and the "decision" state 216, when the value of the switch 38 is reached it moves to the "locked open" state 214 to isolate the fault in the segment 70. Another test by the recloser 30 shows no fault and power is restored to the segment 72, and thus all of the segments have power except the segment 70 with the fault.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A power restoration system for an electrical power distribution network, the system comprising:
   at least one feeder;
   a plurality of power sources available to provide power to the at least one feeder;
   a plurality of normally closed reclosing devices electrically coupled along the at least one feeder, each normally closed reclosing device including an interrupter and one or more sensors for measuring conditions on the feeder at both sides of the reclosing device, where each normally closed reclosing device detects a fault condition based upon sensor data and opens its interrupter in response to the fault condition and where the normally closed reclosing devices are coordinated with each other to open in response to the fault condition depending on its location along the at least one feeder; and
   a plurality of normally closed switches electrically coupled along the feeder between each adjacent pair of normally closed reclosing devices, each switch including one or more sensors for measuring conditions on one or both sides of the switch, each switch being assigned a position code having a value for each of the plurality of power sources that determines when the switch will open in response to the fault condition and which power source the switch is currently receiving power from, wherein timing control between the reclosing devices and the switches allows the switch to be selectively opened to isolate the fault within a single feeder section between each pair of adjacent switches or between each switch and a reclosing device.

2. The system according to claim 1 wherein the number of switches between adjacent normally closed reclosing devices is three.

3. The system according to claim 1 wherein the plurality of power sources include a first power source at one end of the at least one feeder and a second power source at an opposite end of the at least one feeder, the system further comprising a first normally open reclosing device including an interrupter and one or more current and voltage sensors for measuring current on the at least one feeder and measuring voltage on the at least one feeder at both sides of the first normally open reclosing device, the first normally open reclosing device preventing power from the second power source to flow on the at least one feeder.

4. The system according to claim 1 wherein the plurality of normally closed reclosing devices are assigned a time curve characteristic (TCC) value so that a first normally closed reclosing device downstream from one of the power sources has the longest TCC value and a last normally closed reclosing device downstream from the one power source has the shortest TCC value.

5. The system according to claim 1 wherein the plurality of normally closed reclosing devices are assigned a same time curve characteristic (TCC) value.

6. The system according to claim 1 wherein the plurality of normally closed reclosing devices are assigned a time curve characteristic (TCC) code having a plurality of TCC values where a TCC value in the code sets the TCC value of the normally closed reclosing device depending on which of the plurality of power sources the normally closed reclosing device is receiving power from.

7. The system according to claim 1 wherein the at least one feeder is two feeders including a main feeder having a power source at each end and a branch feeder that is tapped off of the main feeder and has a power source at an opposite to the main feeder.

8. The system according to claim 1 wherein the at least one feeder is a three-phase feeder.

9. A power restoration system for an electrical power distribution network, the system comprising:
   a first feeder having a first end and a second end;
   a first power source available to provide power to the first feeder at its first end;
   a second power source available to provide power to the first feeder at its second end;
   a first normally closed reclosing device provided in the first feeder adjacent to the first power source and allowing the first power source to provide power to the first feeder during normal operation;
   a first normally open reclosing device provided in the first feeder adjacent to the second power source and allowing the second power source to provide power to the first feeder during power restoration conditions;
   a second feeder having a first end and a second end coupled to the first feeder;
   a third power source available to provide power to the second feeder at its first end;
   a second normally open reclosing device provided in the second feeder adjacent to the third power source and allowing the third power source to provide power to the second feeder during power restoration conditions;
   at least second and third normally closed reclosing devices provided along the first feeder between the first and second normally closed reclosing devices and allowing the first power source to provide power to the first feeder downstream of the normally closed reclosing device during normal operation, wherein each of the normally closed and normally open reclosing devices includes an interrupter and one or more current and voltage sensors for measuring current on the feeder and measuring voltage on the feeder at both sides of the reclosing device, where each normally closed reclosing device detects fault current and opens its interrupter in response to fault current and where the normally closed reclosing devices are coordinated with each other to open in response to fault current depending on its location along the first feeder; and a plurality of normally closed switches electrically coupled along the first and second feeders between each adjacent pair of normally closed reclosing devices, each switch including one or more current and voltage sensors for measuring current on the first or second feeder and measuring voltage on the first or second feeder at one or both sides of the switch, each switch being assigned a position code having a value for each of the first, second and third power sources that determines when the switch will open in response to the fault current and which power source the switch is currently receiving power from, wherein timing control between the reclosing devices and the switches allows the switch to be selectively opened to isolate the fault within a single feeder section between each pair of adjacent switches or between each switch and a reclosing device.

10. The system according to claim 9 wherein the number of switches between adjacent reclosing devices is three.

11. The system according to claim 9 wherein the first, second and third normally closed reclosing devices are assigned a time curve characteristic (TCC) value that determines when the reclosing device performs fault testing so that the first normally closed reclosing device has a longer TCC value than the second normally closed reclosing device and the second normally closed reclosing device has a longer TCC value than the third normally closed reclosing device.

12. The system according to claim 11 wherein the first and second normally open reclosing devices have a TCC value that is the same and is shorter than the TCC value of the third normally closed reclosing device.

13. The system according to claim 11 wherein the first and second normally open reclosing devices are assigned a delay so that they do not perform fault testing before the first, second and third normally closed reclosing devices finish performing fault testing, and wherein the delay of the second normally open reclosing device is longer than the delay of the first normally open reclosing device.

14. The system according to claim 9 wherein the first, second and third normally closed reclosing devices and the first and second normally open reclosing devices are assigned a same time curve characteristic (TCC) value that determines when the reclosing device performs fault testing.

15. The system according to claim 14 wherein the first and second normally open reclosing devices are assigned a delay so that they do not perform fault testing before the first, second and third normally closed reclosing devices finish performing fault testing, and wherein the delay of the second normally open reclosing device is longer than the delay of the first normally open reclosing device.

16. The system according to claim 9 wherein the first, second and third normally closed reclosing devices and the first and second normally open reclosing devices are assigned a time curve characteristic (TCC) code where a first TCC value in the code sets the TCC value of the reclosing device when it is receiving power from the first power source, a second TCC value in the code sets the TCC value of the reclosing device when it is receiving power from the second power source, and a third TCC value in the code sets the TCC value of the reclosing device when it is receiving power from the third power source.

17. A power restoration system for an electrical power distribution network, the system comprising at least one feeder, a plurality of power sources available to provide power to the at least one feeder, a plurality of normally closed reclosing devices electrically coupled along the at least one feeder, at least one normally open recloser electrically coupled to the at least one feeder, and a plurality of normally closed switches electrically coupled along the at least one feeder between each adjacent pair of normally closed reclosing devices, each switch being assigned a position code having a value for each of the plurality of power sources that determines when the switch will open in response to the fault current and which power source the switch is currently receiving power from, wherein timing control between the reclosing devices and the switches allows the switch to be selectively opened to isolate the fault within a single feeder section between each pair of adjacent switches or between each switch and a reclosing device.

18. The system according to claim 17 wherein the plurality of normally closed reclosing devices are assigned a time curve characteristic (TCC) value so that a first normally closed reclosing device downstream from one of the power sources has the longest TCC value and a last normally closed reclosing device downstream from the one power source has the shortest TCC value.

19. The system according to claim 17 wherein the plurality of normally closed reclosing devices are assigned a same time curve characteristic (TCC) value.

20. The system according to claim 17 wherein the plurality of normally closed reclosing devices are assigned a time curve characteristic (TCC) code having a plurality of TCC values where a TCC value in the code sets the TCC value of the normally closed reclosing device depending on which of the plurality of power sources the normally closed reclosing device is receiving power from.

* * * * *